(12) United States Patent
Higashira et al.

(10) Patent No.: US 9,964,890 B2
(45) Date of Patent: May 8, 2018

(54) RUBBER MEMBER FOR DEVELOPING ROLL, AND METHOD FOR MANUFACTURING SAME

(71) Applicants: NOK Corporation, Tokyo (JP); Synztec Co., Ltd., Tokyo (JP)

(72) Inventors: Toshihiro Higashira, Kanagawa (JP); Atsushi Ikeda, Kanagawa (JP); Tomohiro Kondo, Kanagawa (JP)

(73) Assignees: NOK Corporation, Tokyo (JP); Synztec Co., Ltd., Tokyo (JP)

( * ) Notice: Subject to any disclaimer, the term of this patent is extended or adjusted under 35 U.S.C. 154(b) by 9 days.

(21) Appl. No.: 15/300,765

(22) PCT Filed: Apr. 8, 2015

(86) PCT No.: PCT/JP2015/061015
§ 371 (c)(1),
(2) Date: Sep. 29, 2016

(87) PCT Pub. No.: WO2015/156330
PCT Pub. Date: Oct. 15, 2015

(65) Prior Publication Data
US 2017/0023876 A1    Jan. 26, 2017

(30) Foreign Application Priority Data
Apr. 8, 2014 (JP) ................. 2014-079615

(51) Int. Cl.
*G03G 15/08* (2006.01)
*C09D 5/00* (2006.01)
(Continued)

(52) U.S. Cl.
CPC .......... *G03G 15/0808* (2013.01); *C09D 5/00* (2013.01); *C09D 7/125* (2013.01); *C09D 7/1283* (2013.01);
(Continued)

(58) Field of Classification Search
None
See application file for complete search history.

(56) References Cited

U.S. PATENT DOCUMENTS

| | | | | |
|---|---|---|---|---|
| 2007/0177909 A1* | 8/2007 | Takagi | ............... | G03G 15/0818 399/286 |
| 2008/0146427 A1* | 6/2008 | Osaku | ............... | G03G 15/0233 492/56 |

(Continued)

FOREIGN PATENT DOCUMENTS

| | | |
|---|---|---|
| JP | 2504978 | 4/1996 |
| JP | 9269648 | 10/1997 |

(Continued)

*Primary Examiner* — Erma C Cameron
(74) *Attorney, Agent, or Firm* — K. David Crockett, Esq.; Niky Economy Syrengelas, Esq.; Crockett & Crockett, PC

(57) ABSTRACT

It is an object of the present invention to provide a development roll rubber member that has a uniformly roughened surface on a rubber member surface, that is capable of ensuring a sufficient thickness without contaminating a peripheral portion while maintaining a flexibility in a coating layer and a convex portion without impairing softness of a rubber substrate layer, and that has the coating layer achieving non-tackiness and low friction, and a method of manufacturing the same, and the object is achieved by putting a reactive silicone oil, an isocyanate compound, and a diluent solvent capable of dissolving both the reactive silicone oil and the isocyanate compound into a reaction container, by causing a prepolymerization reaction in which the reactive silicone oil and the isocyanate compound are reacted into a polymerized state in the diluent solvent in the reaction container while dissolution in the solvent is maintained, by subsequently mixing a polyol and an isocyanate compound solution and using silicone rubber particles 101 to prepare an application liquid of a coating layer 13
(Continued)

component, and by applying and curing the application liquid around the development roll 1 for formation.

5 Claims, 2 Drawing Sheets

(51) Int. Cl.
    *C09D 7/12*     (2006.01)
    *C09D 175/04*     (2006.01)
    *B05D 1/02*     (2006.01)
    *B05D 3/02*     (2006.01)

(52) U.S. Cl.
    CPC ............. *C09D 7/1291* (2013.01); *C09D 7/65* (2018.01); *C09D 7/69* (2018.01); *C09D 7/70* (2018.01); *C09D 175/04* (2013.01); *G03G 15/0818* (2013.01); *B05D 1/02* (2013.01); *B05D 3/0254* (2013.01); *G03G 2215/0863* (2013.01)

(56) References Cited

U.S. PATENT DOCUMENTS

2008/0292366 A1* 11/2008 Akama ............... G03G 15/0818
    399/286
2008/0304874 A1* 12/2008 Takagi ............... G03G 15/0818
    399/286

FOREIGN PATENT DOCUMENTS

| JP | 3112489 | 9/2000 |
| JP | 3552868 | 5/2004 |
| JP | 3566563 | 6/2004 |
| JP | 3605519 | 10/2004 |
| JP | 3605523 | 10/2004 |

* cited by examiner

RUBBER MEMBER FOR DEVELOPING ROLL, AND METHOD FOR MANUFACTURING SAME

FIELD OF THE INVENTIONS

The present invention relates to a development roll rubber member and a method of manufacturing the same and more particularly to a development roll rubber member that has a uniformly roughened surface on a rubber member surface, that is capable of ensuring a sufficient thickness without contaminating a peripheral portion while maintaining a flexibility in a coating layer and a convex portion without impairing softness (conformability) of a rubber substrate layer, and that has the coating layer achieving non-tackiness and low friction, and a method of manufacturing the same.

BACKGROUND OF THE INVENTIONS

For a development process in a recent development apparatus in a nonmagnetic single-component development system, a contact development system is known that uniformly presses a development roll with toner (developer) adhering thereto against a photoreceptor for development (see FIG. 3). In FIG. 3, reference numerals 51, 52, 53, 54, and 55 denote a development roll, a regulation blade, a supply roll, a photoreceptor, and toner, respectively.

In general, while an electrostatic latent image means forms an electrostatic latent image on a surface of a photoreceptor drum based on predetermined image information, a toner supply roll supplies toner onto a surface of a development roll, and the toner supplied onto the development roll is regulated to a uniform thickness by a developer amount regulation member (hereinafter also referred to as a "regulation blade") to form a uniform thin layer of toner on the surface of the development roll.

The development roll having the toner thin layer formed on the surface causes the toner to sequentially adhere to the electrostatic latent image formed on the photoreceptor drum in a nip portion or a proximity portion to the photoreceptor drum. The toner development is performed in this way.

To acquire a uniform high-density image in such a contact development system, it is important to form a uniform and thin toner adhesion layer on the development roll surface. For this purpose, a sufficient toner conveyance amount must be maintained by forming a uniformly roughened surface at the development roll surface and a uniform gap must be ensured from the regulation blade.

The development roll typically has a structure formed by accumulating a conductive rubber-like elastic body on a circular cylindrical surface of a core material made of metal, a fibrous material, or a resin molded body. A coating layer made of a resin is disposed on the surface of the rubber-like elastic body to take measures against (1) a problem that a component contained in rubber migrates to a surface to contaminate an opposite material, (2) a problem that a volume resistance value largely varies due to environmental changes, (3) a problem that a large coefficient of dynamic friction necessitates a large torque for rotation because of a relation of friction with a contacting opposite material, and (4) problems of tack of toner, tack to an opposite material, occurrence of frictional noise, dirt adhesion, etc. due to a tack property and a high friction coefficient property.

However, since a hard component is often applied as the coating layer, characteristics of rubber may impaired or deformation of rubber may result in a crack in the coating layer or abrasion of the coating layer.

Although methods of achieving a soft coating layer with low tackiness and low friction include a method of adding an oil component, an oil component is less persistent in terms of low tackiness and low friction and may bleed on a surface and cause contamination of opposite and peripheral portions.

Patent Document 1 discloses that a coating layer made of a reaction product (fluorine-containing polyurethane) between a urethane resin and a fluorine-containing compound having a functional group is formed on a rubber-based conductive layer surface.

This coating layer may block a migrating contaminant as described above in the rubber-based conductive layer and therefore may prevent contamination of a photoreceptor drum surface due to the migrating contaminant.

However, even when a development roll includes the coating layer, toner is rubbed between the development roll surface and a thinning blade or a photoreceptor drum, and therefore, frictional heat due to rubbing facilitates the toner to melt.

If the toner melts, a so-called filming phenomenon of causing the toner to fixedly adhere to the development roll surface appears and adversely affects a print image. The filming also appears on the photoreceptor drum surface and, in this case, a filming portion appears on an image as a streak-like pass-through. The deterioration of toner facilitates melting and causes this problem to easily occur.

Particularly, because of increases in speed and resolution of recent image forming apparatuses, toner has a lower melting point and a smaller diameter and therefore more easily melts due to heat.

The filming is notable in a toner sealing portion applying a strong stress to toner and, in this case, the sealing properties of toner are affected, resulting in a problem such as a toner leak in the worst case.

Patent Document 2 discloses a technique of forming a coating layer from a resin containing a reaction product of a fluorine-containing resin having a functional group reactive with an isocyanate group, a polyol compound, and a polyisocyanate compound.

While maintaining characteristics of fluororesin such as prevention of contamination of an opposite member such as a photoreceptor, prevention of adhesion of toner, control of charging of toner, resistance adjustment, and control of friction coefficient, this technique enables acquisition of favorable flexibility and can achieve a longer life from favorable conformability to elastic deformation of rubber, foam material, etc. without causing a trouble such as breaking. This consequently eliminates exudation of a rubber compounding agent from a crack of the coating layer, adhesion of toner to the crack, a change in friction coefficient, etc. leading to inability to achieve an initial purpose in an early stage, and an OA device member excellent in long term durability is acquired.

However, increases in speed and resolution of recent image forming apparatuses and a lower melting point of toner have given rise to a problem of inability to sufficiently deal with a trouble.

Moreover, since a rubber singly-layer roll has a large coefficient of dynamic friction on a surface and necessitates a large torque for rotating a development roll because of a relation of friction with contacting members such as a toner thinning blade and a toner supply roll, a more powerful motor is required, which is an obstacle for reductions in size, power, and cost of an apparatus.

On the other hand, particles are dispersed in a surface of a coating layer to form uniform roughness on the surface to maintain a toner conveyance amount in a recently generally used technique.

By dispersing particles in the surface of the coating layer to form a convex shape, point contact of toner can be achieved to prevent the deterioration of toner.

Patent Document 3 discloses a coating layer having a material with low compression set, for example, a silicone resin and a urethane resin uniformly dispersed in a binder as resin particles for the purpose of surface roughening.

However, if hard resin particles etc. are used as the particles, since a large amount of particles must be added for forming concave and convex uniformly at the development roll surface, the resin particles occupy a large portion of the development roll surface and thereby make the coating layer itself hard.

It is confirmed that the hardness of the coating layer itself and the hardness of convex portions (particles) affect a toner stress.

Since the hard resin particles form the convex portions of the coating layer, when particles come into contact with toner, the toner tends to deteriorate, and silica etc. of an external additive component of the toner adhere to the wall surfaces of the particles and act as a factor of the filming.

Patent Document 4 discloses a technique of increasing a size of particles used in a surface layer so as to increase roughness of a roll surface because a toner conveyance amount can be made larger in accordance with a magnitude of roughness of the development roll surface.

However, excessively large surface roughness leads to the coarseness and unevenness of an acquired image and the degrading in fogging characteristics and makes it difficult to form uniform roughness across the entire roll surface.

Variations in roughness of the roll surface may result in a biased toner conveyance amount or an uneven toner charge amount.

On the other hand, for a polyurethane coating layer covering a conductive rubber layer, a technique is disclosed for using a reaction mixture containing polyol, an isocyanate compound, and a both-end reactive silicone oil to introduce a siloxane component inside a polyurethane molecular chain rather than simply binding the siloxane component as a side chain to the polyurethane molecular chain so that a siloxane molecule is introduced in a manner crosslinking the polyurethane molecules. This technique enables provision of a development roll excellent in filming resistance while retaining advantages of conventional polyurethane layers capable of solving a problem of contamination of the photoreceptor drum surface and a problem of drive torque of the development roll (Patent Documents 5, 6, and 7).

By subjecting a volatile silicone oil to a reaction condition of polyol and the isocyanate compound, since the silicone oil is less compatible with the isocyanate compound, when the mixture thereof is applied to a rubber surface and fired to dry a solvent, the volatile silicone oil is no longer able to dissolve in the mixture, forms a multiplicity of minute droplets before subsequent volatilization, and therefore forms a film having holes (cissing, dents) generated at corresponding locations. By forming the coating layer as a porous body in this way, the coating layer surface is configured as a roughened surface.

However, if the mixture is applied to a rubber substrate to the extent of 10 μm, actually generated dents have a width exceeding 20 μm and a depth of about 3 μm, therefore make the conveyance amount too high, causing a problem of higher cost, and allow toner to enter and accumulate in dent portions, causing problems of deteriorating the toner, acting as a factor of the filming, etc.

PRIOR ART DOCUMENTS

Patent Documents

Patent Document 1: JP-B-2504978
Patent Document 2: JP-B-3552868
Patent Document 3: JP-A-09-269648
Patent Document 4: JP-B-3112489
Patent Document 5: JP-B-3605523
Patent Document 6: JP-B-3605519
Patent Document 7: JP-B-3566563

SUMMARY

Problem to be Solved by the Invention

In view of the above, characteristics required for a coating layer covering a rubber substrate layer (an elastic rubber layer) are as follows:

(1) a uniformly roughened surface is formed on a surface of a development roll;
(2) while flexibility is maintained, neither damage nor toner stress is applied to an opposite member and toner;
(3) a thickness can be ensured for sufficiently avoiding influence of rubber; and
(4) non-tackiness and low friction can be achieved.

Therefore, an object of the present invention is to provide a development roll rubber member that has a uniform roughened surface on a rubber member surface, that is capable of ensuring a sufficient thickness without contaminating a peripheral portion while maintaining flexibility in a coating layer and a convex portion without impairing softness (conformability) of a rubber substrate layer, and that has the coating layer achieving non-tackiness and low friction, and a method of manufacturing the same.

Other problems of the present invention will become apparent from the following description.

Means for Solving Problem

The problem is solved by the following aspects of the invention.

1. A method of manufacturing a development roll rubber member acquired by applying and curing a coating layer component made up of silicone rubber particles and a binder around a development roll having a rubber substrate layer, the method including:

putting a reactive silicone oil, an isocyanate compound, and a diluent solvent capable of dissolving both the reactive silicone oil and the isocyanate compound into a reaction container;

causing a prepolymerization reaction in which the reactive silicone oil and the isocyanate compound are reacted into a polymerized state in the diluent solvent in the reaction container while dissolution in the solvent is maintained;

subsequently mixing a polyol and an isocyanate compound solution with a reaction solution generated by the prepolymerization reaction and using the silicone rubber particles to prepare an application liquid of a coating layer component made up of the silicone rubber particles and a binder; and applying and curing the application liquid of the coating layer component around the development roll for formation.

2. The method of manufacturing a development roll rubber member of 1, wherein the diluent solvent is a solvent swelling the silicone rubber particles.

3. The method of manufacturing a development roll rubber member of 1 or 2, wherein the silicone rubber particles are spherical silicone rubber particles having an epoxy group on a surface or spherical silicone rubber particles having a methacryl group.

4. The method of manufacturing a development roll rubber member of any one of 1 to 3, wherein the polyol is a fluorine-containing polyol.

5. The method of manufacturing a development roll rubber member of any one of 1 to 4, wherein a plasticizer is used in the binder of the coating layer.

6. A development roll rubber member manufactured by the method of manufacturing of any one of 1 to 5.

7. The development roll rubber member of 6, wherein the hardness of the coating layer is a durometer A (instantaneous) hardness (JIS K6253:1997) of 5 degrees or more and 50 degrees or less in terms of hardness measured by a durometer MD-1 manufactured by KOBUNSHI KEIKI.

8. The development roll rubber member of 6 or 7, wherein a coating layer surface dent between the silicone rubber particles preferably has an opening portion width of 20 μm or less and a depth of 5 μm or less.

Effect of the Invention

The present invention can provide the development roll rubber member that has a uniform roughened surface on a rubber member surface, that is capable of ensuring a sufficient thickness without contaminating a peripheral portion while maintaining flexibility in a coating layer and a convex portion without impairing softness (conformability) of a rubber substrate layer, and that has the coating layer achieving non-tackiness and low friction, and a method of manufacturing the same.

DETAILED DESCRIPTION OF THE INVENTIONS

Embodiments of the present invention will now be described.

1. Method of Manufacturing Development Roll Rubber Member

A method of manufacturing a development roll rubber member of the present invention is acquired by applying and curing a coating layer component made up of silicone rubber particles and a binder around a development roll having a rubber substrate layer.

Figure 1:
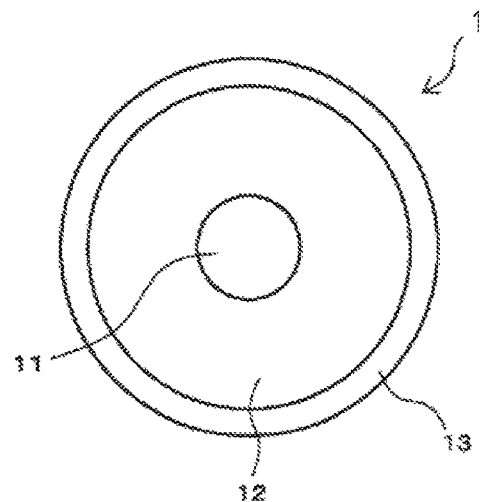
FIG. 1 is a cross-sectional view of a surface perpendicular to a longitudinal direction of an example of a development roll to which the present invention may be applied.
Figure 2:
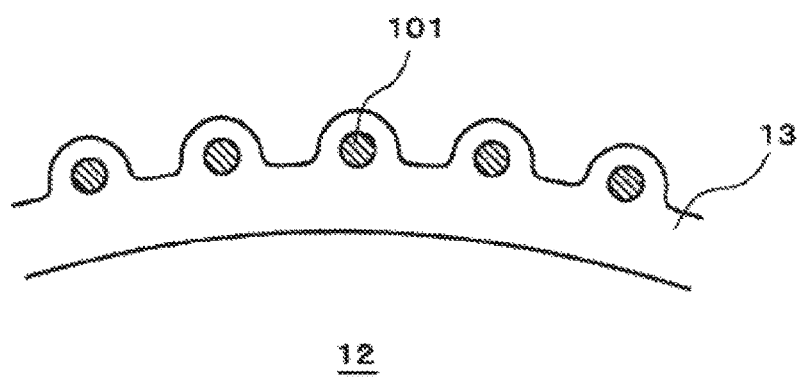
FIG. 2 is an enlarged cross-sectional view of a main portion of a coating layer making up a development roll rubber member according to the present invention.
Figure 3:
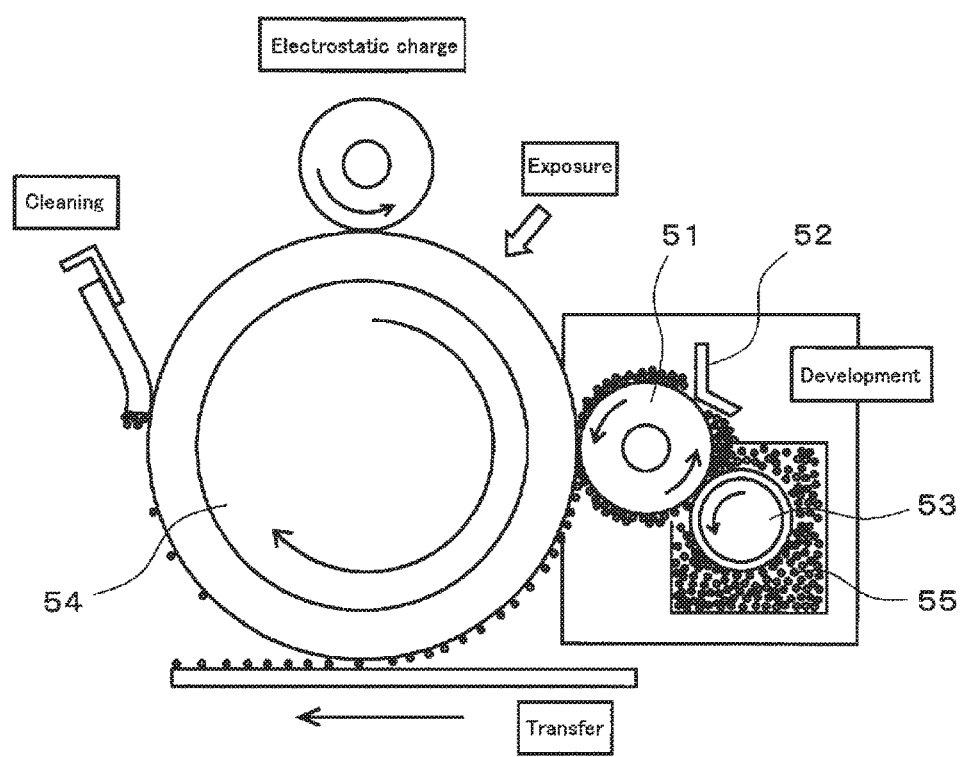
FIG. 3 is a schematic of an example of a development apparatus using the development roll according to the present invention.

As shown in FIGS. 1 and 2, a development roll 1 has at least one rubber substrate layer 12 around a core material 11 and also has a coating layer 13 formed around the rubber substrate layer 12.

The method of manufacturing a development roll rubber member of the present invention is characterized by a method of preparing an application liquid of a coating layer component.

First, the method is characterized in that a prepolymer reaction is performed. In particular, a reactive silicone oil, an isocyanate compound, and a diluent solvent capable of dissolving both the reactive silicone oil and the isocyanate compound are put into a reaction container to cause a prepolymerization reaction in which the reactive silicone oil and the isocyanate compound are reacted into a polymerized state in the diluent solvent in the reaction container while dissolution in the solvent is maintained. Such prepolymerization provides a uniform film without separation of the reactive silicone oil even when the solvent has volatilized.

Second, the method is characterized in that an application liquid (coating liquid) of a coating layer component is prepared by mixing a polyol and an isocyanate compound solution with the reaction solution generated from the prepolymerization reaction and by using and dispersing silicone rubber particles.

By applying the application liquid of the coating layer component acquired as described above around the development roll to form a coating film, the development roll rubber member can be formed and the development roll can thereby consequently be manufactured.

The reactive silicone oil is repelled on a rubber surface and bleeds on a coating layer surface when used solely. The reactive silicone oil and the isocyanate compound are normally separated without mixing with each other. By selecting and using a solvent dissolving both the reactive silicone oil and the isocyanate compound, both the oil and the compound are dissolved into a mixed state in the solvent.

However, when the solvent volatilizes after application, the reactive silicone oil and the isocyanate compound are separated if not reacted, resulting in a film with concave and convex or a film in a repelled state instead of formation of a uniform film.

Therefore, the prepolymerization reaction is performed to achieve a polymerized state while the dissolution in the solvent is maintained.

In the prepolymerization, the reaction is caused to proceed by allowing to stand for three days at room temperature and heating at 120° C. for three hours and 150° C. for one hour. For safety, preferably, blending is followed by allowing to stand for three days or more at room temperature.

In the present invention, to examine a preporimerization reaction state, a reaction residual portion of the isocyanate compound can be examined to comprehend the reaction state thereof.

A prepolymer solution after reaction between the reactive silicone oil and the isocyanate compound dissolves a subsequently mixed isocyanate compound, urethane, etc., and, after the application and the volatilization of the solvent, a uniform film is acquired without separation.

If the reactive silicone oil and the isocyanate compound are not reacted, the silicon oil separates and bleeds on a surface and the hardness of the film is not reduced, leading to insufficient prevention of toner deterioration.

Additionally, if the reactive silicone oil bleeds on the film surface, the silicone oil adheres to a photoreceptor, causing a trouble in printing.

Since the silicone oil is sufficiently reacted with isocyanate through preporimerization, the reactive silicone oil does not bleed on the surface and reduces the hardness of the film, and the film without tack is acquired because of the silicone component.

Since the reactive silicone oil and the isocyanate compound are reacted in advance, the film is formed without a dent and, therefore, a toner conveyance amount can freely be adjusted by concave and convex of silicone rubber particles.

Since the reactive silicone oil is contained and the binder can therefore be softened in the present invention, the deterioration of toner can be reduced and the occurrence of longitudinal streak pattern can be reduced at the time of printing.

<Formation of Coating Layer>

When the coating layer is formed in the present invention, after applying the coating liquid in which the coating layer component is mixed and dispersed, the liquid state is preferably maintained for a certain time to move rubber particles 101 to an upper layer portion in the layer as shown in FIG. 2 before curing.

The development roll rubber member of the present invention is acquired by applying and drying or firing the coating liquid.

Depending on the rubber substrate layer of the development roll surface on which the coating layer is formed, an adhesive (primer) is preferably applied in advance before application of the coating liquid of the present invention.

If the coating layer is formed via the primer on the rubber substrate layer, since a flat film must be acquired on the surface of the primer, the primer is appropriately selected depending on the rubber substrate layer to which the primer is applied and the binder and, for example, an isocyanate-based, silane-based, or silicone-based primer is selected.

Although a method of applying the coating liquid is not particularly limited, the coating liquid can be applied by a known application method such as a dipping method, a spraying method, a roll-coating method, a doctor blade method, and a flow-coating method.

Although a drying condition can be set as appropriate, the drying is preferably performed at a room temperature to 150° C. for 5 to 20 minutes.

Although firing may not be performed, the firing is preferably performed at a room temperature to 230° C. for about 5 to 120 minutes and can be set as appropriate depending on heat resistance of rubber.

Since the silicone rubber particles are used with the binder and uniformly dispersed and applied to the rubber substrate layer surface, uniform surface roughness can be achieved on the coating layer surface, and the coating layer can be kept soft and can be given low tackiness and low friction.

Since the silicone rubber particles are used, the coating layer itself is softened. Because the silicone rubber particles at convex portions coming into contact with an opposite member (e.g., toner) are soft and form point contact, the dependency on the hardness of the binder is small and the stress to an opposite surface can be reduced to achieve lower tackiness and lower friction.

Since the particles are rubber particles, no tack occurs in the development roll rubber member between a resin component used for a toner component and silicone and, since the convex of the silicone rubber particles forms the point contact, the impact and stress of the toner particles can be reduced to prevent the deterioration of toner.

If the convex is formed by resin particle as in the conventional case, the hardness of surface impairs flexibility etc., and applies a stress to toner. Rubber particles made of EPDM, SBR, urethane, etc. other than silicone are not preferable because of tackiness.

In the present invention, preferably, the surface of the coating layer is formed into a convex shape due to the presence of the rubber particles with intervals less than 5 m between the rubber particles and the rubber particles are present in an aggregate state of five or more particles. Shorter intervals between the rubber particles formed into a convex shape are more preferable because a surface structure is formed such that toner does not enter between the rubber particles or into an opening portion.

To achieve the interval preventing toner from entering between the silicone rubber particles, a method of closest packing can be applied by combining several types of large and small particles to fill small particles in gaps of large particles, in addition to a particle diameter and an amount of particles.

When the silicone rubber particle shape is a spherical shape or substantially spherical rubber beads are used, the point contact is further be achieved between the roll surface and the supply roll and toner is conveyed without stress. The rubber particles preferably retain or recover the spherical shape or the substantially spherical shape at a low load.

If the particles are used with the binder and are uniformly dispersed for application by spraying, particles made of an inorganic substance or PTEE and resin particles may precipitate in the coating liquid and are hardly uniformly applied. In the case of the rubber particles, the precipitation can further be reduced by using a solvent swelling the rubber particles so as to enable uniform application. Moreover, since the viscosity of the coating agent is increased by rubber, application properties are improved.

Although the friction and abrasion resistance is degraded by addition of the silicone rubber particles, the resistance can be improved by the binder and the addition of a lubricating component.

<Dispersion Technique>

The rubber particles are dispersed by a ball mill, an attritor, a basket mill, a sand mill, a sand grinder, a Dyno-mill, a dispermat, an Sc mill, a spike mill, an agitator mill, etc. along with the binder when a medium is used, or are dispersed by ultrasonic waves, a homogenizer, a ultrasonic homogenizer, a nanomizer, a dissolver, a disperser, a high-speed impeller disperser, etc. when a medium is not used.

2. Description of Coating Layer

<Reactive Silicone Oil>

The reactive silicone oil used in the present invention may be reactive with an isocyanate compound and is preferably a reactive silicone oil having active hydrogen.

The reactive silicone oils having active hydrogen include, for example, a silicone oil having an amino group (primary and/or secondary amino groups), a silicone oil having a mercapto group, and a silicone oil having a hydroxyl group (e.g., a silicone oil having a carboxyl group, a silicone oil having a phenolic OH group, a silicone oil having an alcoholic OH group).

These reactive silicone oils are commercially available as amino-modified silicone oils, mercapto-modified silicone oils, carboxyl-modified silicone oils, phenol-modified silicone oils, and carbinol-modified silicone oils.

In the present invention, any silicone oils having a reactive organic group at only one terminal or both terminals and/or in a side chain are usable.

More preferable reactive silicone oils can be expressed by the following general formula (1) or (2).

[Chemical 1]

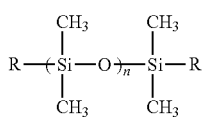

general formula (1)

[Chemical 2]

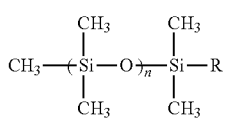

general formula (2)

In general formulas (1) and (2), R is —$C_3H_6OC_2H_4OH$ or —$C_3H_6OCH_2$—$C(CH_2OH)_2C_2H_5$ and n is an integer of about 20 or less.

Particularly preferable reactive silicone oils are silicone oils of general formula (1) having R that is —$C_3H_6OC_2H_4OH$ and among these, silicon oils having n of about 10 is particularly preferable. Such silicon oils are also commercially available.

Silicone oil may have bi- or more-functional groups or monofunctional groups at both terminals, and monofunctional groups are used when non-tackiness is important while bi- or more-functional groups are used when non-contamination, flexibility, and hardness are important, although the both types may be used together.

A silicone oil having hydrogen bound to silicon in a silicone skeleton may also be usable.

The addition of the reactive silicone oil provides the effect of softening a binder component as described above. To avoid application of stress to toner, a softer binder component is more preferable, and the hardness is more preferably lowered by adding a fluorine elastomer or a silicone oil rather than lowering the hardness by a urethane binder since the tackiness can be reduced.

The coating layer is preferably kept soft because deformation of a rubber layer acting as a base material can be followed. If the coating layer hardly follows the deformation of rubber etc., a crack may occur in the coating layer and may result in exudation of a rubber compounding agent from the crack, adhesion of toner to the crack, a change in friction coefficient, etc. leading to inability to achieve an initial purpose as a roll in an early stage.

<Isocyanate Compound>

The isocyanate compound used in the present invention can be preferably diisocyanates such as diphenylmethane diisocyanate (MDI), tolylene diisocyanate (TDI), and hexamethylene diisocyanate (HDI) as well as a biuret modified product, an isocyanurate modified product, and a urethane modified product thereof.

A particularly preferable isocyanate compound is hexamethylene diisocyanate and a biuret modified product, an isocyanurate modified product, and a urethane modified product thereof. When the isocyanate compound has a longer molecular chain, a polyurethane coating layer having higher flexibility may be generated.

<Polyol>

The polyol used in the present invention is preferably in a liquid state at room temperature (20 to 30° C.) and various polyols are usable. The polyol must have an electrostatic property and may preferably react with the isocyanate compound to generate a coating layer (polyurethane) having a large triboelectrification series.

Such polyol can preferably be exemplified by polyether-polyol such as polyalkylene glycol, for example, polyethylene glycol, polypropylene glycol, tetramethylene glycol, and copolymers thereof.

Among these, fluorine-containing polyol is particularly preferable. The fluorine-containing polyol not only reacts with the isocyanate compound to generate a coating layer having a large triboelectrification series but also reduces an environmental dependency of resistance value of the generated coating layer. When a fluorine content of fluorine-containing polyol is higher, the triboelectrification series is made negatively larger.

Such fluorine-containing polyol can preferably be exemplified by a copolymer mainly made of ethylene trifluoride monomer (copolymer polyol containing an ethylene trifluoride monomer unit as a main component) and a copolymer mainly made of ethylene tetrafluoride monomer (copolymer polyol containing an ethylene tetrafluoride monomer unit as a main component).

These fluorine-containing polyols can be commercially available products preferably including "Zeffle" manufactured by Daikin Industries (copolymer polyol containing an ethylene tetrafluoride monomer unit as a main component), "Lumiflon" manufactured by Asahi Glass Industry (copolymer polyol containing a trifluoromonohaloethylene monomer unit as a main component), and "Defensa" manufactured by Dainippon Ink and Chemicals.

These fluorine-containing polyols are mainly made of ethylene tetrafluoride monomer, for example, and contain at least 2 mol of hydroxymonocarboxylic acid ester of acrylic acid and/or glycol monoester of acrylic acid copolymerized therewith in total.

These fluorine-containing polyols are provided with an OH component by the acrylic acid ester monomer (OH of carboxyl group in the case of hydroxymonocarboxylic acid ester of acrylic acid and non-esterified glycol OH in the case of glycol monoester of acrylic acid).

In the present invention, the copolymer polyol containing an ethylene tetrafluoride monomer is particularly preferable.

<Silicone Rubber Particle>

The silicone rubber particles used in the present invention preferably have a structure of crosslinking of organopolysiloxane such as dimethyl polysiloxane, and polyorganosilsesquioxane although not particularly limited thereto.

Although rubber particles of EPDM, SBR, urethane, acryl, etc. are known as rubber particles other than silicone, those particles are not preferable because of tackiness and high possibility of filming. Preferably, the silicone rubber particles used in the present invention has no tackiness to the toner component regardless of low hardness.

Method of softening the coating layer of the rubber surface and achieving low tackiness and low friction include a method in which silicone rubber is used and uniformly dispersed in the binder and applied to the rubber surface, and this is preferable since the coating layer itself is softened because the silicone rubber particles are used even if the binder is hard.

Since the silicone rubber particles at convex portions coming into contact with an opposite member are soft and form the point contact, the dependency on the hardness of the binder is small and the stress to an opposite surface can be reduced to achieve lower tackiness and lower friction.

Since the particles are rubber particles, the flexibility and sealing properties of rubber are not impaired in a sealing component etc., and no tack occurs in an image forming apparatus rubber member between a resin component used for the toner component and silicone and, since the convex of the silicone rubber particles forms the point contact, the impact and stress of the toner particles can be reduced to prevent the deterioration of toner.

If the convex is formed by resin particle instead of the rubber particles, the hardness of surface impairs flexibility and sealing properties, and applies a stress to toner in the image forming apparatus rubber member, which is not preferable.

The development roll rubber member can be adjusted in terms of a toner conveyance amount in accordance with a size and a shape of toner within the ranges thereof and can have a rubber particle diameter set so as not to allow the toner to enter dents and, in the present invention, the particle diameter of the silicone rubber particles of the present invention is preferably 0.2 to 10 μm, more preferably 1 to 5 μm.

If the particle diameter of the silicone rubber particles is less than 0.2 μm, concave and convex cannot be formed on the coating layer surface and the point contact cannot be formed between the toner and the particles at the time of printing. As a result, an impact of the toner cannot be absorbed (contact resistance cannot be made small) and the toner deterioration progresses, which is not preferable.

The particle diameter of the silicone rubber particles exceed 10 μm is not preferable since the convex portions on the coating layer surface due to the particles become too high, resulting in an excessively large toner conveyance amount and an impact of the toner on the rubber particle convex surface, and the toner deterioration progresses. Moreover, the toner enters a gap between the particles and increases the toner stress, which is not preferable.

If the particles are too large, excessively large surface roughness leads to the coarseness and unevenness of an acquired image and the degrading in fogging characteristics. Additionally, if the particles are too large, it is difficult to form uniform roughness across the entire coating layer surface. Variations in roughness of the roll surface may result in a biased toner conveyance amount or an uneven toner charge amount.

The hardness of the silicone rubber particles is preferably 10 to 80 degrees and more preferably 50 to 75 degrees in terms of durometer A (instantaneous) (JIS K6253:1997) and is selected as appropriate depending on a surface concave/convex state etc.

The durometer A (instantaneous) hardness less than 10 degrees is not preferable since the shape of the rubber particles cannot be retained when the particles come into contact with an opposite material, leading to breakage of silicone rubber itself or inability to restore an original size, and therefore, a friction coefficient of the coating layer increases, resulting in tack.

The durometer A (instantaneous) hardness exceeding 80 degrees is not preferable since stress is applied to the opposite material and the hardness of the coating layer itself also increases, causing a crack and breaking of the coating layer. If the particles are hard, the toner deteriorates when the particles come into contact with the toner, and silica etc. of an external additive component of the toner adhere to the particle surfaces and act as a factor of the filming, which is not preferable.

The silicone rubber particles used in the present invention is made of a silicone cured material having rubber elasticity with a linear organopolysiloxane block represented by general formula (3) in a molecular structural formula.

[Chemical 3]

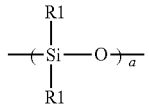

general formula (3)

In general formula (3), R1 is a group selected from one or two or more monovalent organic groups with a carbon number 1 to 20 selected from: alkyl groups such as a methyl group, an ethyl group, a propyl group, and a butyl group; aryl groups such as a phenyl group and a tolyl group; alkenyl groups such as a vinyl group and an allyl group; aralkyl groups such as a β-phenylethyl group and β-phenylpropyl group; monovalent halogenated hydrocarbon groups such as a chloromethyl group and a 3,3,3-trifluoropropyl group; and organic groups containing reactive groups such as an epoxy group, an amino group, a mercapto group, an acryloxy group, and a methacryloxy group, and 90 mol % or more thereof are preferably methyl groups.

It is noted that "a" preferably denotes an integer of 5 to 5,000, more preferably an integer of 10 to 1,000. If "a" is less than 5, since the characteristics of linear organopolysiloxane are not sufficiently provided, the effects of reducing hardness and improving lubricating properties are not sufficiently acquired and, although the maximum value of "a" is not particularly defined, if "a" is larger than 5,000, it is difficult to actually manufacture the silicone rubber fine particles.

The curing is achieved by common crosslinking of silicone rubber and is preferably achieved by an addition reaction.

Although the silicone rubber particles may be manufactured by using a method of curing in high-temperature spray-dry, a method of curing in organic solvent, or a method of curing after emulsification thereof at the time of reaction and curing, since silicone rubber spherical fine particles are used as aqueous dispersion in the manufacturing of the silicone rubber fine particles of the present invention, a method of curing in silicone emulsion particles is preferable.

The silicone rubber particles used in the present invention can be a resinous polymer having an organosilsesquioxane unit represented by general formula (4) as a constituent unit.

[Chemical 4]

general formula (4)

In formula (4), R² is a monovalent organic group with a carbon number 1 to 20 made up of one or two or more groups selected from: alkyl groups such as a methyl group, an ethyl group, a propyl group, and a butyl group; aryl groups such as a phenyl group and a tolyl group; alkenyl groups such as a vinyl group and an allyl group; aralkyl groups such as a β-phenylethyl group and β-phenylpropyl group; monovalent halogenated hydrocarbon groups such as a chloromethyl group and a 3,3,3-trifluoropropyl group; and organic groups having reactive groups such as an epoxy group, an amino group, a mercapto group, an acryloxy group, and a methacryloxy group.

The silicone rubber spherical particle surfaces used in the present invention may be subjected to surface treatment of organoalkoxysilane represented by general formula (5).

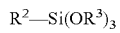

In formula (5), R2 is the same monovalent organic group as general formula (4), and R3 is an alkyl group with a carbon number 1 to 6 such as a methyl group, an ethyl group, a propyl group, and a butyl group.

For example, one or a combination of two or more of the followings are usable: methyltrimethoxysilane, methyltriethoxysilane, methyltripropoxysilane, methyltributoxysilane, ethyltrimethoxysilane, propyltrimethoxysilane, butyltrimethoxysilane, N-(β-amino ethyl)-γ-amino propyltrimethoxysilane, γ-glycidoxypropyltrimethoxysilane, vinyltrimethoxysilane, phenyltrimethoxysilane, γ-methacryloxypropyltrimethoxysilane, γ-mercaptopropyltrimethoxysilane, 3,3,3-trifluoropropyltrimethoxysilane, 3,3,4,4,5,5,6,6,6-nonafluorohexyltrimethoxysilane, 3,3,4,4,5,5,6,6,7,7,8,8,9,9,10,10,10-heptadecafluorodecyltrimethoxysilane, etc.

By using organoalkoxysilane at the same time, it is expected that compatibility, lubricating properties, etc. with a base material can further be improved in the acquired silicone particles.

The surfaces of the silicone rubber particles may be subjected to treatment with a silane coupling agent, silica, a metallic oxide, dimethicone, etc., for non-tackiness, lubricity, abrasion resistance, and aggregation prevention. The surface treatment may uniformly coat the entire surfaces of the rubber particles or may partially coat the surfaces.

A core shell formed by using a silicone resin as an outer shell with rubber inside is not preferable in the present invention since poor adhesion between the silicone resin on the surface and the binder component of the coating layer may cause particles to drop out and the silicone resin on the surface acts as a factor of toner deterioration.

The surface treatment with an epoxy group or a methacryl group can improve the adhesiveness between the binder and the particles to prevent dropout and can prevent the toner deterioration while the particles can uniformly be disposed in the binder.

Commercially available products preferably include "EP-2600" (average particle diameter: 2 μm; JIS-A rubber hardness: 40 degrees; without functional group), "EP-2601" (average particle diameter: 2 μm; JIS-A rubber hardness: 40 degrees; functional group: epoxy group), and "E-2720" (average particle diameter: 2 μm; JIS-A rubber hardness: 70 degrees; functional group: methacryl group) manufactured by Dow Corning Toray, and other usable products include "E-506S" (cross polymer of dimethicone and vinyldimethicone; average particle diameter: 4 μm; JIS-A rubber hardness: 30 degrees), "EP-9215 Cosmetic Powder" (cross polymer of dimethicone and vinyldimethicone; average particle diameter: 4 μm, JIS-A rubber hardness: 60 degrees), "E-508" (oil impregnation powder, cross polymer of dimethicone and vinyldimethicone, surface dimethicone treatment; average particle diameter: 4 μm; JIS-A rubber hardness: 17 degrees), "9701 Cosmetic Powder" (cross polymer of dimethicone and vinyldimethicone, surface silica treatment; average particle diameter: 4 μm; JIS-A rubber hardness: 40 degrees), "EP-9261 TI Cosmetic Powder" (cross polymer of dimethicone and vinyldimethicone, surface titanium oxide treatment; average particle diameter: 4 μm, JIS-A rubber hardness: 40 degrees), and "EP-9293" (cross polymer of dimethicone and vinyldimethicone, surface alumina treatment; average particle diameter: 4 μm, JIS-A rubber hardness: 40 degrees) manufactured by Dow Corning Toray.

Core shells of silicone rubber coated with a silicone resin such as "KMP600" manufactured by Shin-Etsu Chemical are not preferable since particles may drop out from a binder due to a thick shell portion, hard particles, and poor adhesiveness between the binder of the coating layer and the silicone resin of the core shells.

If the silicone rubber particles are not subjected to the surface treatment, the silicone rubber particles may aggregate with each other to form excessively large surface concave and convex and may make the toner conveyance amount too large or generate a white streak.

<Dilution Solvent>

For the dilution solvent, a dilution solvent capable of dissolving both the reactive silicone oil and the isocyanate compound is used. Such dilution solvents include aqueous solvents and organic solvents, and low-boiling and high-boiling solvents can be used in combination depending on a drying rate.

Specifically, the dilution solvents include common organic solvents such as methyl ethyl ketone (MEK), methyl isobutyl ketone (MIBK), tetrahydrofuran (THF), acetone, ethyl acetate, butyl acetate, toluene, xylene, heptane, cyclohexanone, isophorone, and acetone.

These dilution solvents not only can dissolve both the reactive silicone oil and the isocyanate compound but also swell the rubber particles and are therefore preferably used since the rubber particles are swelled in the application liquid to eliminate cissing and dents of the coating layer.

Additionally, the dilution solvents can slow the precipitation of the rubber particles in the application liquid and the liquid can be applied such that the rubber particles uniformly protrude on the rubber surface.

Temperature and time of heating are set as appropriate such that the rubber particles are restored to an original size by heating after application.

In the application liquid (coating liquid) of coating layer components made up of the binder and the rubber particles for forming the coating layer, a solid content concentration ratio to the dilution solvent is preferably within a range of 3 to 50 wt %, more preferably 5 to 30 wt %. A lower solid content concentration results in dripping during application and delays drying, and a higher concentration makes it difficult to control the graininess and thickness of the application surface.

<Plasticizer>

Addition of a plasticizer to the binder is preferable since the hardness of the coating layer can be reduced and the toner deterioration and the occurrence of white streak can be prevented.

For the plasticizer, commercially available plasticizers having viscosity of 1 to 10000 cp can be used such as phthalic acid-based, adipate-based, sebacate-based, phosphate-based, adipic acid-based, trimellitic acid-based, epoxy-based, phosphoric acid-based, polyester-based, polyether-based, paraffin-based plasticizers.

Plasticizers with low polarity have poor compatibility and bleed on a surface to generate the possibility to contaminate the photoreceptor and, therefore, epoxy-based, phosphoric acid-based, adipate-based, polyester-based, polyether-based plasticizers are used.

Among these, particularly, polyester-based and polyether-based plasticizers are preferably used since the reactive silicone oil and the isocyanate compound are used.

Lower viscosity results in less contamination and, preferably, viscosity of 1 to 100 cp is favorable.

<Prepolymer Amount>

A combination ratio of the silicone oil in a prepolymer making up the coating layer of the present invention is preferably within a range of 5 to 95% in a solid ratio and can be set to an intended combination ratio.

A larger silicone oil amount leads to better long-term stability of prepolymer liquid and poor uniform film formation. Conversely, a larger isocyanate amount leads to poor long-term stability of prepolymer liquid and excellent uniform film formation.

When a silicone amount is large, silicone terminals are formed and, therefore, a dissolved state is achieved in solvent even after the reaction proceeds; however, when an isocyanate amount is large, progression of polymerization prevents dissolution in solvent as the reaction proceeds, resulting in poor long-term stability. Therefore, a larger silicone amount is more preferable in terms of the combination ratio.

A smaller reaction amount of prepolymer is not preferable since dents are generated on the surface and the dents deteriorate toner and result in early occurrence of white streak.

<Amount of Application Liquid Making Up Coating Layer>

With regard to the formulation of the application liquid (coating liquid) making up the coating layer of the present invention, the silicone rubber particles preferably account for a range of 3 to 30 wt %, more preferably 5 to 20 wt % in solid weight percent (solid ratio).

A solid ratio of the silicone rubber particles exceeding 30 wt % is not preferable because of problems such as a reduction in abrasion resistance, a reduction in film strength, a reduction in adhesiveness to the rubber substrate layer, and a higher toner conveyance amount although the hardness of the coating layer surface is reduced and a large amount of convex shapes is formed on the surface to promote non-tackiness and low friction.

A solid ratio of the rubber amount less than 3 wt % is not preferable because of elimination of the convex formation of the rubber particles on the coating layer surface, the degrading of non-tackiness and low friction, the elimination of reduction in stress to the opposite material, and the occurrence of printing trouble.

The solid weight percent of the isocyanate compound is preferably within a range of 10 to 70 wt %, more preferable 30 to 60 wt %. The isocyanate compound less than 10 wt % degrades the adhesiveness, strength, and abrasion resistance of the rubber. The isocyanate compound exceeding 70 wt % is not preferable because of the accelerated toner deterioration, the tack to toner, the worsening of printing characteristics due to embedment of added rubber particles.

The solid weight percent of the polyol (e.g., fluorine-containing polyol) is preferably within a range of 5 to 20 wt %, more preferable 7 to 11 wt %. The polyol less than 5 wt % has problems such as the worsening of applicability and the tack to toner. The polyol exceeding 20 wt % is not preferable because of problems such as the worsening of adhesiveness and abrasion resistance and the inhibition of migration of rubber particles to the surface.

The solid weight percent of the plasticizer is preferably within a range of 5 to 50 wt %. The plasticizer lower than the range of 5 to 50 wt % is not preferable since unreduced hardness deteriorates toner and the occurrence of white streak cannot be prevented. The plasticizer exceeding the range is not preferable because a weakened film results in peeling or breaking of the film at the time of printing and leads to variations in conveyance amount and image density.

<Coating Layer Hardness>

The hardness of the development roll rubber member (coating layer) acquired by the manufacturing method described above is preferably adjusted to achieve a rubber state having a durometer A (instantaneous) hardness (JIS K6253:1997) of 5 degrees or more and 50 degrees or less, preferably 10 degrees or more and 45 degrees or less when measured by the micro durometer MD-1 manufactured by KOBUNSHI KEIKI.

By adjusting the hardness of the coating layer to the same hardness as the rubber, the toner deterioration can be prevented. The hardness less than 5 degrees has problems such as the worsening of abrasion resistance of the binder and the occurrence of tack.

<Surface Shape>

The shape of the coating layer surface has the surface concave and convex formed by the silicone rubber particles accumulated on the surface.

The surface of the coating layer preferably has 200 or more of the silicone rubber particles per 50 $\mu m^2$. The number of the rubber particles exposed on the surface can be determined by the particle diameter and the rubber particle amount.

If the particle diameter is 0.2 to 10 $\mu m$, the number of the rubber particles is preferably 200 or more, more preferably 500 or more per 50 $\mu m^2$. If the number is less than 200, since the concave/convex formation on the surface by the rubber particles is reduced as described above, the point contact of the toner and the impact absorption of the toner cannot be achieved and the toner deterioration proceeds.

If the opposite material is flat resin or metal, larger particle and aggregate sizes are favorable and gaps formed between the particles to some extent are favorable in accordance with the surface pressure thereof.

If the opposite material is toner, the particle size is determined depending on a size and a conveyance amount of the toner and the particles in an aggregation state are favorable since shorter particle intervals and smaller gaps prevent the toner from entering the gaps.

The height of the surface convex is preferably 0.5 to 8.0 $\mu m$. The height smaller than 0.5 $\mu m$ is not preferable since the point contact is no longer formed between the toner and the particles and the resistance of the toner cannot be reduced. The height larger than 0.8 $\mu m$ is not preferable since the toner enters the gaps between the particles and increases the toner stress.

One spherical particle may form a convex portion or particles may aggregate to form a convex portion.

If particles aggregate, higher convex makes the gaps between the particles larger and acts as a factor of the toner deterioration and, therefore, it is preferable that the particles be uniformly arranged.

The silicone rubber particles are particles smaller than the toner particle diameter and it is preferable that the toner be supported by points due to the presence of the silicone rubber particles on the surface.

According to the present invention, a coating layer surface dent preferably has an opening portion width of 20 $\mu m$ or less and a depth of 5 $\mu m$ or less. If the opening portion width is larger than this width, the adhesion and friction coefficients are made higher and the toner enters the opening portion, causing the toner deterioration. If the depth is 5 $\mu m$ or more, a reduction in strength of the film leads to a reduction in abrasion resistance and the toner enters the opening portion, causing the toner deterioration. Deep and large dents between particles are not preferable since the toner accumulates in the dents and may result in deterioration of the toner.

The coating layer thickness is preferably 5 µm or more and the thicker coating layer is more preferable since an increase in the rubber particles present in the coating layer enhances the effect of toner stress alleviation and impact absorbance.

The coating layer thickness is preferably kept at a certain level or more since the thickness can be ensured for enabling sufficient avoidance of problems such as the tack to the toner, the tack to the opposite material, the occurrence of friction noise, and the adhesion of contaminant due to the tack properties and the rubber properties such as a high friction coefficient.

When the rubber particles are uniformly present in the coating layer surface, non-tackiness and low friction are achieved in the particle portions and the hardness of the surface is reduced.

If the particles are in a state of protruding from the coating layer (a convex shape), the higher effect is provided and the point contact with the opposite material and the toner is achieved.

However, since the surface particles are dropped off or broken if the rubber substrate layer surface is subjected to a heavy load or shear, the surface particles cannot be used in a part with a high surface pressure and a high stress, which is a future problem.

3. Description of Rubber Substrate Layer

The rubber substrate layer of the development roll may be made of silicone rubber, polyurethane-based elastomer, ethylene propylene diene rubber (EPDM), styrene-butadiene rubber (SBR), Acrylonitrile-butadiene rubber (NBR), hydrogenated acrylonitrile-butadiene rubber (HNBR), chloroprene rubber (CR), epichlorohydrin rubber (ECO), etc., although not particularly limited.

In the present invention, silicone rubber is preferably used because of low hardness and reduced setting.

To the rubber substrate layer, various additives can be added as needed such as a conducting agent, a filler, a bulking agent, a reinforcing agent, a processing aid, a curing agent, a vulcanizing accelerator, a crosslinking agent, a crosslinking aid, an antioxidizing agent, a plasticizer, an ultraviolet absorber, a pigment, a silicone oil, an auxiliary agent, a surfactant, etc.

The conducting agent can be known conducting agents such as ion conducting agents and electron conducting agents.

The ion conducting agents can include salts of group I metals in periodic table such as $LiCF_3SO_3$, $NaClO_4$, $LiClO_4$, $LiAsF_6$, $LiBF_4$, $NaSCN$, $KSCN$, and $NaCl$; ammonium salts such as $NH_4Cl$, $(NH_4)_2SO_4$, and $NH_4NO_3$; salts of group II metals in periodic table such as $Ca(ClO_4)_2$ and $Ba(ClO_4)_2$; complexes of salts thereof and polyhydric alcohols such as 1,4-butanediol, ethylene glycol, polyethylene glycol, propylene glycol, and polypropylene glycol and derivatives thereof; complexes of salts thereof and monools of ethylene glycol monomethyl ether, ethylene glycol monoethyl ether, polyethylene glycol monomethyl ether, and polyethylene glycol monoethyl ether; quaternary ammonium salts of cationic surfactants; anionic surfactants such as aliphatic sulfonates, alkylsulfuric acid ester salts, and alkyl phosphoric ester salts; and ampholytic surfactants such as betaine.

The electron conducting agents can include carbon-based substances such as carbon black and graphite; metals or alloys such as aluminum, silver, gold, a tin lead alloy, and a copper nickel alloy; metallic oxides such as zinc oxide, titanium oxide, aluminum oxide, stannous oxide, antimony oxide, indium oxide, silver oxide; materials acquired by applying conductive metal plating of copper, nickel, silver, etc. to various fillers.

These ion conducting agents and electron conducting agents are in the form of powder or fiber and may be used independently or in combination of two or more agents. Among these, carbon black is preferably used in terms of easiness of control of conductivity and economic efficiency.

EXAMPLES

Examples of the present invention will be described. The present invention is not limited by the examples.

Example 1

Preparation of Prepolymer urethane-modified hexamethylene diisocyanate (solid concentration: 80%) ("Duranate E402-80B" manufactured by Asahi Chemical Industry) 5.6 wt %
reactive silicone oil ("X-22-160AS" manufactured by Shin-Etsu Chemical) 45.5 wt %
butyl acetate 48.9 wt %
The above components were mixed and reacted at 120° C. for three hours to acquire prepolymer.

<Preparation of Application Liquid (Coating Liquid) of Coating Layer Component>
prepolymer 24.69 wt %
fluorine-containing polyol (solid concentration: 50%) ("Zeffle GK510" manufactured by Daikin Industries) 10.2 wt %
urethane-modified hexamethylene diisocyanate (solid concentration: 80%) ("Duranate E402-80B" manufactured by Asahi Chemical Industry) 16.45 wt %
dilution solvent; butyl acetate 45.26 wt %
The above components were mixed to prepare a dispersion liquid in which the binder and the dilution solvent were mixed.

The prepared dispersion liquid was mixed with 3.4 parts by weight of silicone rubber particles ("EP-2720" manufactured by Dow Corning Toray with durometer A (instantaneous) hardness (JIS K6253: 1997) of 70 degrees and an average particle diameter of 2 µm (1 to 2 µm)) to acquire a coating liquid (1).

<Preparation of Rubber Coated Roll>

An iron shaft core material with an outer diameter of 10 mm was coated with conductive silicone rubber having a volume resistivity (JIS C 2139 (2008)) of 106 Ωcm and a durometer A (instantaneous) hardness (JIS K6253:1997) of 45 degrees and was ground by a cylindrical grinding machine to adjust ten point height of roughness of JIS B 0601 (1994) to 8 µm (Rz) and to form a rubber substrate layer with an outer diameter of 16 mm so as to acquire a rubber coated roll.

<Preparation of Development Rolle Rubber Member and Development Roll>

After the coating liquid (1) was subjected to high speed stirring and dispersed in advance by a bead mill, the liquid was further stirred by a stirrer for 10 minutes to prepare a coating liquid (2).

To the rubber coated roll, "KBP-40" manufactured by Shin-Etsu Silicone was applied by spraying as a primer and the coating liquid (2) was then applied by spraying to the application surface.

Subsequently, the coating film was cured by heating treatment at 160° C. for 40 minutes to form a development roll rubber member acting as a coating layer, thereby fabricating a development roll.

The thickness of the surface coating layer in this case was 7 μm.

<Evaluation Method>

The development roll rubber member acquired in Example 1 was evaluated in terms of the following items and the result is described in Table 1.

(1) Coefficient of Dynamic Friction

After the coating liquid (2) acquired as above was applied by spraying to a 2-mm-thick rubber sheet surface to the surface coating layer thickness of 10 μm and fired, coefficient of dynamic friction was measured by the surface property tester "Heidon Tribogear" manufactured by Shinto Scientific in conformity with ASTM D-1894 (JIS K7125: 1999, ISO 8295:1995). The result is described in Table 1.

(Test Conditions)

Opposite material: SUS304 steel ball with the diameter of 10 mm,

Moving velocity: 50 mm/min,

Load: 0.49 N,

Amplitude: 50 mm (2) Evaluation of Adhesiveness by Cross-Cut Test

For the acquired development roll rubber member, a tape peel test after a cross-cut test was conducted in conformity with JIS K5600-5-6:1999 (ISO2409:1992) to evaluate adhesiveness based on the following criteria and the result is described in Table 1.

<Evaluation Criteria>

○: without peeling of a coating film of a bent portion without waving of a cut line Δ: without peeling of a coating film of a bent portion with waving of a cut line x: with peeling of a coating film (3) Evaluation of Flexibility by Extension Test After application of the primer to the rubber coated roll surface, the coating liquid (2) was applied by spraying to the thickness of 10 μm and fired to form a coating rubber member.

After the surface layer (coating layer) of the acquired coating rubber member was sliced 5 mm thick to form a rubber sheet, the sheet was stretched by 50% to visually check whether color changes to white and to check whether a crack occurs in the sheet (coating layer) with a microscope for performing evaluation based on the following criteria and the result is described in Table 1.

<Evaluation Criteria>

○: without a crack of the coating layer without color change to white

Δ: with a crack of the coating layer with color change to white x: with a large crack of the coating layer with color change to white (4) Evaluation of Hardness of Coating Layer Only After 100 μm of coating liquid was applied to a PTFE surface and fired at 160° C. for 30 minutes, about twenty 100-μm sheets peeled from the PTFE are laminated to the thickness of 2 mm to measure the hardness (durometer A (instantaneous) hardness (JIS K6253:1997)) by the micro rubber durometer MD-1 manufactured by KOBUNSHI KEIKI.

The result is described in Table 1

It can be evaluated that MD-1 hardness within a range of 20 to 33 is favorable since no stress is applied to toner.

(5) Evaluation of Opening Portion Width of Surface Dents

The rubber member coating layer surface was photographed by using the laser microscope "VK-9700" manufactured by Keyence at magnifications of 1000 and 3000 to evaluate the opening portion width of dents of the coating layer surface and the result is described in Table 1.

(6) Evaluation of Opening Portion Depth of Surface Dents

The rubber member coating layer surface was photographed by using the laser microscope "VK-9700" manufactured by Keyence at the magnifications of 1000 and 3000 to evaluate the opening portion depth of dents of the coating layer surface and the result is described in Table 1.

(7) Evaluation of Number of Particles at Roll Surface

The roll surface was photographed at three arbitrary points by using the laser microscope "VK-9700" manufactured by Keyence at the magnification of 3000. By photographing at three arbitrary points, a contour of a convex portion of contained rubber particles is displayed in black.

A portion having this black contour and a circularity of 0.5 or more was considered as a rubber particle portion to measure the number of rubber particles in the range of 50 μm×50 μm in an image for performing evaluation based on the following criteria, and the result is described in Table 1. It can be evaluated that the number of rubber particles equal to or greater than 200 is good, that the number of rubber particles equal to or greater than 100 and less than 200 is slightly bad, and that the number of rubber particles less than 100 is bad.

(8) Toner Conveyance Amount

The toner on the development roll after passing the development blade was sucked and the toner collected on filter paper was weighed to measure a toner amount per unit area (mg/cm$^2$). The result is described in Table 1.

The conveyance amount is preferably 0.4 to 0.6 mg/cm$^2$ and more preferably 0.4 to 0.55 mg/cm$^2$. A larger amount is not preferable because of an increase in toner consumption. Although a smaller conveyance amount leads to better torque consumption, an amount less than 0.4 mg/cm$^2$ is not preferable since printing becomes light.

(9) Printed Longitudinal Streak Image Evaluation

Evaluation was made on an image defect appearing as a longitudinal white streak pattern in a black solid image because repeated rubbing of toner with the development blade causes the toner to fixedly adhere to the development blade and the toner supply is blocked at a toner-fixed convex portion.

The acquired rubber member (development roll) was incorporated into a cartridge ("TN-27J" manufactured by Brother) of a commercially available monochrome laser printer ("HL-2240D" manufactured by Brother) to conduct a 3500-sheet paper-feed durability test under low-temperature low-humidity environment (10° C., 20% RH) at 1% density/sheet, and a black solid image was printed every 500 sheets to visually check the occurrence of longitudinal streak.

(1% density/sheet: an image with toner (black) disposed and fixed in a region occupying 1% of the entire printing region surface on one printed sheet)

(black solid image: an image with toner (black) disposed and fixed on the entire printing region surface)

The evaluation was made by using the following determination criteria for a longitudinal streak image defect. The result is described in Table 1.

<Determination Criteria>

⊚: without occurrence of longitudinal streak after feeding 3500 sheets

○: without occurrence of longitudinal streak after feeding 2000 sheets

Δ: with occurrence of longitudinal streak after feeding 1500 sheets x: with occurrence of longitudinal streak after feeding 1000 sheets or less

(10) Image Density Maintenance Evaluation

Evaluation was made on whether a desired black solid image can be maintained without causing fixation of a toner component to the development roll surface, i.e., so-called filming, due to repeated rubbing of toner with the development roll, the photoreceptor drum, and the regulation blade after printing of the predetermined number of sheets. A target density was acquired in an initial image from the specifications of the rolls.

A roll with each specification was incorporated into a cartridge ("TN-27J" manufactured by Brother) of a commercially available monochrome laser printer ("HL-2240D" manufactured by Brother) to conduct a 3000-sheet paper-feed durability test under low-temperature low-humidity environment (10° C., 20% RH) at 1% density/sheet, and an image pattern provided with four upper, lower, left and right black solid portions (25 mm×25 mm) was printed after 2500 sheets to measure transmission density at 12 point (3 points per one black solid portion) in total by a black-and-white transmission densitometer ("X-rite 310T" manufactured by X-rite) to calculate an average value. The result is described in Table 1.

It can be evaluated that an image density of 1.90 or more is a favorable image density.

(11) Horizontal White Stripe Image Evaluation (Filming Resistance) Test

Evaluation was made on a degree of image defect appearing as a lateral white streak pattern in a solid printed image because of toner supply blocked by formation of a dent or a toner-fixed convex portion due to compression set at abutting portions between the development roll and the photoreceptor drum or the regulation blade in the case of printing under room temperature environment after long storage under high-temperature environment.

A roll with each specification was incorporated into a cartridge ("TN-27J" manufactured by Brother) of a commercially available monochrome laser printer ("HL-2240D" manufactured by Brother) to continuously print one black solid image, 20 half-tone images, and one black solid image after the cartridge was mounted on a drum unit and left for 120 hours under high-temperature environment (45° C., 90% RH) and was taken out and left for 8 hours or more under room temperature.

The evaluation was made by visually checking whether periodic lateral white streak images occur in the last black solid image, based on the following criteria. The result is described in Table 1.

<Determination Criteria>

○: without lateral streak x: with lateral streak

Examples 2 to 6

The coating liquid (1) was acquired in the same way as Example 1 except that the amounts described in Example 1 were changed as described in Table 1 in Example 1.

The coating liquid (2) was then prepared from the coating liquid (1) in the same way as the Example 1 to evaluate a development roll rubber member acquired in the same way as Example 1 in terms of the items described in Example 1 and the result is described in Table 1.

Comparison Example 1

The coating liquid (1) was acquired in the same way as Example 1 except that reactive silicone oil ("X-22-160AS" manufactured by Shin-Etsu Chemical) was added to the formulation described in Example 1 while prepolymer was set to 0 parts by weight to change the amounts as described in Table 1 in Example 1.

The coating liquid (2) was then prepared from the coating liquid (1) in the same way as the Example 1 to evaluate a development roll rubber member acquired in the same way as Example 1 in terms of the items described in Example 1 and the result is described in Table 1.

Comparison Example 2

The coating liquid (1) was acquired in the same way as Example 1 except that prepolymer was set to 0 parts by weight in the formulation described in Example 1 to change the amounts as described in Table 1 in Example 1.

The coating liquid (2) was then prepared from the coating liquid (1) in the same way as the Example 1 to evaluate a development roll rubber member acquired in the same way as Example 1 in terms of the items described in Example 1 and the result is described in Table 1.

Comparison Example 3

The coating liquid (1) was acquired in the same way as Example 1 except that reactive silicone oil ("X-22-160AS" manufactured by Shin-Etsu Chemical) was added to the formulation described in Example 1 to change the amounts as described in Table 1 in Example 1.

The coating liquid (2) was then prepared from the coating liquid (1) in the same way as the Example 1 to evaluate a development roll rubber member acquired in the same way as Example 1 in terms of the items described in Example 1 and the result is described in Table 1.

Reference Example 1

The coating liquid (1) was acquired in the same way as Example 1 except that the silicone rubber particles in the formulation described in Example 1 was changed to silicone rubber particles ("KMP-600" manufactured by Shin-Etsu Chemical; the durometer A (instantaneous) hardness (JIS K6253:1997): 30 degrees; the average particle diameter: 5 μm (1 to 15 μm)) in Example 1.

The coating liquid (2) was then prepared from the coating liquid (1) in the same way as the Example 1 to evaluate a development roll rubber member acquired in the same way as Example 1 in terms of the items described in Example 1 and the result is described in Table 1.

Reference Example 2

The coating liquid (1) was acquired in the same way as Example 1 except that the silicone rubber particles in the formulation described in Example 1 was changed to silicone rubber particles ("Tospearl 120" manufactured by Momentive; the durometer A (instantaneous) hardness (JIS K6253:1997): 95 degrees; the average particle diameter: 2 m (1 to 3 m)) in Example 1.

The coating liquid (2) was then prepared from the coating liquid (1) in the same way as the Example 1 to evaluate a development roll rubber member acquired in the same way as Example 1 in terms of the items described in Example 1 and the result is described in Table 1.

TABLE 1

(wt %)

| | | Example 1 | Example 2 | Example 3 | Example 4 | Example 5 | Example 6 |
|---|---|---|---|---|---|---|---|
| combination ratio | fluorine-containing polyol | 10.2 | 8.16 | 7.27 | 9.18 | 8.16 | 7.14 |
| | prepolymer | 24.69 | 28.58 | 31.75 | 22.21 | 19.74 | 17.28 |
| | urethane-modified hexamethylene diisocyanate | 16.45 | 13.16 | 11.73 | 14.80 | 13.16 | 11.52 |
| | reactive silicone oil | — | — | — | — | — | — |
| | polyether-based plasticizer | — | — | — | 3.06 | 6.12 | 9.18 |
| | butyl acetate | 45.26 | 45.00 | 44.14 | 47.35 | 49.42 | 51.48 |
| | silicone rubber particles (JISA hardness 70 degrees, average particle diameter 2 μm (1 to 2 μm)) | 3.4 | 5.1 | 5.11 | 3.4 | 3.4 | 3.4 |
| | silicone rubber particles (JISA hardness 30 degrees, average particle diameter 5 μm (1 to 15 μm)) | — | — | — | — | — | — |
| | silicone resin particles (JISA hardness 95 degrees, average particle diameter 2 μm (1 to 3 μm)) | — | — | — | — | — | — |
| | total | 100.00 | 100.00 | 100.00 | 100.00 | 100.00 | 100.00 |
| | solid concentration (%) | 34.0 | 34.0 | 34.0 | 34.0 | 34.0 | 34.0 |
| | coefficient of dynamic friction | 0.8 | 1.2 | 1.4 | 1.0 | 1.3 | 1.7 |
| | evaluation of adhesiveness by cross-cut test | ○ | ○ | ○ | ○ | ○ | ○ |
| | evaluation of flexibility by extension test | ○ | ○ | ○ | ○ | ○ | ○ |
| | hardness of coating layer only (MD-1 hardness) | 33 | 26 | 20 | 30 | 26 | 22 |
| | opening portion width of surface dents (μm) | 8 | 10 | 15 | 8 | 9 | 12 |
| | opening portion depth of surface dents (μm) | 2 | 2 | 2 | 2 | 2 | 2 |
| | number of particles on roll surface (particles) | 220 | 290 | 350 | 260 | 300 | 320 |
| | toner conveyance amount (mg/cm$^2$) | 0.50 | 0.50 | 0.50 | 0.45 | 0.47 | 0.50 |
| | printed longitudinal streak image evaluation | ○ | ○ | ⊚ | ○ | ○ | ○ |
| | image density maintenance evalutation | 2.00 | 1.95 | 1.90 | 2.00 | 1.95 | 1.90 |
| | lateral white streak image evaluation (filming resistance) test | ○ | ○ | ○ | ○ | ○ | ○ |

| | | Comparison Example 1 | Comparison Example 2 | Comparison Example 3 | Reference Example 1 | Reference Example 2 |
|---|---|---|---|---|---|---|
| combination ratio | fluorine-containing polyol | 11.35 | 34.3 | 10.2 | 10.2 | 10.2 |
| | prepolymer | — | — | 12.3 | 24.69 | 24.69 |
| | urethane-modified hexamethylene diisocyanate | 15.60 | 12.3 | 17.1 | 16.45 | 16.45 |
| | reactive silicone oil | 15.84 | — | 5.6 | — | — |
| | polyether-based plasticizer | — | — | — | — | — |
| | butyl acetate | 53.43 | 50.4 | 51.4 | 45.26 | 45.26 |
| | silicone rubber particles (JISA hardness 70 degrees, average particle diameter 2 μm (1 to 2 μm)) | 3.78 | 3.0 | 3.4 | — | — |
| | silicone rubber particles (JISA hardness 30 degrees, average particle diameter 5 μm (1 to 15 μm)) | — | — | — | 3.4 | — |
| | silicone resin particles (JISA hardness 95 degrees, average particle diameter 2 μm (1 to 3 μm)) | — | — | — | — | 3.4 |
| | total | 100.00 | 100.00 | 100.00 | 100.00 | 100.00 |
| | solid concentration (%) | 34.0 | 30.0 | 34.0 | 34.0 | 34.0 |
| | coefficient of dynamic friction | 0.7 | 1.5 | 0.8 | 0.8 | 1.2 |
| | evaluation of adhesiveness by cross-cut test | ○ | ○ | ○ | ○ | ○ |
| | evaluation of flexibility by extension test | ○ | X | ○ | ○ | ○ |
| | hardness of coating layer only (MD-1 hardness) | 30 | 70 | 32 | 35 | 40 |
| | opening portion width of surface dents (μm) | 30 | 1 or less | 15 | 8 | 10 |
| | opening portion depth of surface dents (μm) | 6 | 1 or less | 6 | 2 | 2 |
| | number of particles on roll surface (particles) | 280 | 80 | 250 | 300 | 400 |
| | toner conveyance amount (mg/cm$^2$) | 0.58 | 0.60 | 0.55 | 0.70 | 0.50 |
| | printed longitudinal streak image evaluation | Δ | X | Δ | Δ | X |
| | image density maintenance evalutation | 2.10 | 1.80 | 2.00 | 2.00 | 1.80 |
| | lateral white streak image evaluation (filming resistance) test | ○ | ○ | ○ | ○ | ○ |

Example 7

The coating liquid (1) was acquired in the same way as Example 1 except that the formulation described in Example 1 was changed as follows in Example 1.

(Change from Example 1)

The silicone rubber particles ("EP-2720" manufactured by Dow Corning Toray) used in the prepared dispersion liquid were changed to the following silicone rubber particles.

<Silicone Rubber Particles>
"EP-2601" manufactured by Dow Corning Toray
Durometer A (instantaneous) hardness (JIS K6253:1997): 40 degrees
Average particle diameter: 2 μm (1 to 2 μm))

The coating liquid (2) was then prepared from the coating liquid (1) in the same way as the Example 1 to evaluate a development roll rubber member acquired in the same way as Example 1 in terms of the items described in Example 1 and the result is described in Table 2.

Example 8

The coating liquid (1) was acquired in the same way as Example 1 except that the formulation described in Example 1 was changed as follows in Example 1.
(Changes from Example 1)
(1) Urethane-modified hexamethylene diisocyanate was changed to isocyanurate ("Burnock DN-981" manufactured by DIC; solid amount: 76%).
(2) The silicone rubber particles were changed to the silicone rubber particles ("EP-2601" manufactured by Dow Corning Toray; the durometer A (instantaneous) hardness (JIS K6253:1997): 40 degrees; the average particle diameter: 2 μm (1 to 2 μm)).

The coating liquid (2) was then prepared from the coating liquid (1) in the same way as the Example 1 to evaluate a development roll rubber member acquired in the same way as Example 1 in terms of the items described in Example 1 and the result is described in Table 2.

Example 9

In example 1, the prepolymer preparation technique was changed as follows.

<Preparation of Prepolymer>
isocyanurate ("Burnock DN-981" manufactured by DIC; solid amount: 76%)) 5.6 wt %
reactive silicone oil ("X-22-160AS" manufactured by Shin-Etsu Chemical) 45.5 wt %
butyl acetate 48.9 wt %
The above components were mixed and reacted at 120° C. for three hours to acquire prepolymer.
The method of preparation of the application liquid (coating liquid) of the coating layer component in Example 1 was changed as follows.
<Preparation of Application Liquid (Coating Liquid) of Coating Layer Component>
prepolymer 26.51 wt %
fluorine-containing polyol (solid concentration: 50%) ("Zeffle GK510" manufactured by Daikin Industries) 8.5 wt %
isocyanurate ("Burnock DN-981" manufactured by DIC; solid amount: 76%)) 18.78 wt %
dilution solvent; butyl acetate 45.19 wt %
The above components were mixed to prepare a dispersion liquid in which a binder and the dilution solvent were mixed.
The prepared dispersion liquid is mixed with the following silicone rubber particles to acquire the coating liquid (1).
<Silicone Rubber Particles>
"EP-2601" manufactured by Dow Corning Toray
Durometer A (instantaneous) hardness (JIS K6253:1997): 40 degrees
Average particle diameter: 2 μm (1 to 2 μm))
The coating liquid (2) was then prepared from the coating liquid (1) in the same way as the Example 1 to evaluate a development roll rubber member acquired in the same way as Example 1 in terms of the items described in Example 1 and the result is described in Table 2.

TABLE 2

|  |  | Example 7 | Example 8 | Example 9 |
|---|---|---|---|---|
|  |  | (wt %) | | |
| combination ratio | fluorine-containing polyol | 8.48 | 8.5 | 8.5 |
| | prepolymer | 26.59 | 26.51 | 26.51 |
| | urethane-modified hexamethylene diisocyanate | 17.79 | — | — |
| | isocyanurate | — | 18.69 | 18.78 |
| | reactive silicone oil | — | — | — |
| | polyether-based plasticizer | — | — | — |
| | butyl acetate | 46.10 | 45.28 | 45.19 |
| | silicone rubber particles (JISA hardness 70 degrees, average particle diameter 2 μm (1 to 2 μm)) | — | — | — |
| | silicone rubber particles (JISA hardness 40 degrees, average particle diameter 2 μm (1 to 2 μm)) | 1.04 | 1.02 | 1.02 |
| | silicone rubber particles (JISA hardness 30 degrees, average particle diameter 5 μm (1 to 15 μm)) | — | — | — |
| | silicone rubber particles (JISA hardness 95 degrees, average particle diameter 2 μm (1 to 3 μm)) | — | — | — |
| total | | 100.00 | 100.00 | 100.00 |
| solid concentration (%) | | 34.0 | 34.0 | 34.0 |
| coefficient of dynamic friction | | 0.5 | 0.6 | 0.6 |
| evaluation of adhesiveness by cross-cut test | | ○ | ○ | ○ |
| evaluation of flexbility by extension test | | ○ | ○ | ○ |
| hardness of coating layer only (MD-1 hardness) (degree) | | 33 | 35 | 36 |
| opening portion width of surface dents (μm) | | 15 | 14 | 15 |
| opening portion depth of surface dents (μm) | | 4 | 3 | 4 |
| number of particles on roll surface (particles) | | 210 | 200 | 210 |
| toner conveyance amount (mg/cm2) | | 0.51 | 0.49 | 0.52 |
| printed longitudinal streak image evaluation | | ◎ | ○ | ○ |

TABLE 2-continued

|  | Example 7 | Example 8 | Example 9 (wt %) |
|---|---|---|---|
| image density maintenance evaluation | 2.00 | 1.90 | 1.95 |
| lateral white streak image evaluation (filming resistance) test | ○ | ○ | ○ |

<Evaluation>

Comparing Examples and Comparison Example 1, it is understood that when isocyanate and reactive silicone oil are contained without being reacted as prepolymer in advance, the surface dent opening portion is increased in width to 30 μm and increased in depth to 6 μm. As a result, a printed longitudinal streak appears in an early stage.

Comparison Example 2 has composition without reactive silicone oil contained and it is understood that this leads to poor flexibility and excessive hardness. Moreover, this makes it difficult for the silicone particles to be present at the development roll surface and the uniform surface roughness is lost. As a result, a printed longitudinal streak appears in an early stage and an image density cannot be maintained. With regard to the fact that the toner conveyance amount was maintained at a constant value regardless of the smaller number of particles at the roll surface, since the polymer acting as the binder component is fluoro-rubber-based, this is considered because the compatibility with toner is different due to the composition thereof from the binder used in Examples.

Comparison Example 3 has composition using prepolymer acquired from reaction between isocyanate and reactive silicone oil in advance and further containing silicone oil, and it is understood that this increases the surface dent opening portion in depth to 6 μm. As a result, a printed longitudinal streak appears in an early stage.

INDUSTRIAL APPLICABILITY

The present invention is applicable to an image forming apparatus development roll rubber member used in a development apparatus of a copying machine, a fax machine, a laser beam printer etc.

For example, the present invention is used in rubber members such as a development roll, a charging roll, a blade, a fixing roll, a fixing belt, and a supply roll used in a toner development type development apparatus.

EXPLANATIONS OF LETTERS OR NUMERALS 1 development roll
11 core material
12 rubber substrate layer
13 coating layer
101 rubber particle
51 development roll
52 regulation blade
53 supply roll
54 photoreceptor
55 toner

We claim:

1. A method of manufacturing a development roll rubber member acquired by applying and curing a coating layer component made up of silicone rubber particles and a binder around a development roll having a rubber substrate layer, the method including:
   putting a reactive silicone oil, an isocyanate compound, and a diluent solvent capable of dissolving both the reactive silicone oil and the isocyanate compound into a reaction container;
   causing a prepolymerization reaction in which the reactive silicone oil and the isocyanate compound are reacted into a polymerized state in the diluent solvent in the reaction container while dissolution in the solvent is maintained;
   subsequently mixing a polyol and an isocyanate compound solution with a reaction solution generated by the prepolymerization reaction and using the silicone rubber particles to prepare an application liquid of a coating layer component made up of the silicone rubber particles and the binder comprising the polyol and isocyanate compound; and
   applying and curing the application liquid of the coating layer component around the development roll to form the development roll rubber member as a coating layer.

2. The method of manufacturing a development roll rubber member of claim 1, wherein the diluent solvent is a solvent capable of swelling the silicone rubber particles.

3. The method of manufacturing a development roll rubber member of claim 1, wherein the silicone rubber particles are spherical silicone rubber particles having an epoxy group on a surface or spherical silicone rubber particles having a methacryl group.

4. The method of manufacturing a development roll rubber member of claim 1, wherein the polyol is a fluorine-containing polyol.

5. The method of manufacturing a development roll rubber member of claim 1, wherein a plasticizer is used in the binder of the coating layer.

* * * * *